United States Patent [19]

Kushiro

[11] Patent Number: 5,625,516

[45] Date of Patent: Apr. 29, 1997

[54] TAPE END DETECTION MECHANISM FOR TAPE CASSETTE

[75] Inventor: Sunao Kushiro, Chiba, Japan

[73] Assignee: Sony Corporation, Tokyo, Japan

[21] Appl. No.: 489,954

[22] Filed: Jun. 13, 1995

[30] Foreign Application Priority Data

Jun. 17, 1994 [JP] Japan ................... 6-135985

[51] Int. Cl.$^6$ ................................................ G11B 23/08
[52] U.S. Cl. ........................................ 360/132; 360/74.6
[58] Field of Search ............................ 360/132, 74.6

[56] References Cited

U.S. PATENT DOCUMENTS

| | | | |
|---|---|---|---|
| 4,644,433 | 2/1987 | Horikawa et al. | 360/132 |
| 4,783,022 | 11/1988 | Onmori et al. | 242/388.2 |
| 4,862,305 | 8/1989 | Kaatagiri et al. | 360/132 |
| 4,886,220 | 12/1989 | Oishi | 360/132 |
| 4,983,496 | 1/1991 | Newell et al. | 430/270 |
| 5,121,275 | 6/1992 | Komiyama | 360/132 |
| 5,222,003 | 6/1993 | Miller et al. | 360/74.6 |
| 5,311,030 | 5/1994 | Higuchi et al. | 250/561 |

FOREIGN PATENT DOCUMENTS

| | | |
|---|---|---|
| 2098778A | 3/1972 | France . |
| 600479 | 6/1978 | Switzerland . |
| 2259804 | 3/1993 | United Kingdom . |

*Primary Examiner*—Stuart S. Levy
*Assistant Examiner*—William J. Klimowicz
*Attorney, Agent, or Firm*—William S. Frommer; Alvin Sinderbrand

[57] ABSTRACT

A tape cassette housing having a mouth extending across its front portion and opening downwardly and forwardly is further provided with a laterally centered hole in back of the mouth and a recess in the bottom surface of the cassette housing through which the lower portion of the hole communicates with the mouth, so that, when the cassette housing is operatively positioned on a deck, a light-emitting element on the deck extends into the mouth and directs a light beam parallel to the deck into a lower portion of a prism also mounted on the deck to extend into the recess and hole of the cassette housing. The prism has a reflecting surface which reflects the received light beam upwardly to a radiating portion of the prism in the hole by which the upwardly reflected beam is split into two oppositely directed lateral beams for detecting opposite ends of a recording tape in the cassette housing.

6 Claims, 6 Drawing Sheets

TAPE END DETECTION MECHANISM FOR TAPE CASSETTE

BACKGROUND OF THE INVENTION

1. Field of the Invention

The present invention relates to a tape end detection mechanism for a tape cassette suitable for use with a tape recorder such as a video cassette recorded (VCR).

2. Description of the Related Art

An example of a tape end detection mechanism for a tape cassette will be described with reference to FIGS. 1 and 2.

As shown in FIGS. 1 and 2, there is provided a tape cassette 1 having a tape supply reel 2 and a tape takeup reel 3 therein. A tape T supplied from the tape supply reel 2 is guided across a mouth portion 5 by a tape guide 4 disposed at the tape supply reel 2 side and a tape guide 6 disposed at the tape takeup reel 3 side, and the tape is then wound around the takeup reel 3.

A tape detection hole 7 is bored in the cassette 1 adjacent the mouth portion 5 intermediate the supply reel 2 and the takeup reel 3. Light-emitting elements 8 and 9 each formed by a light-emitting diode (LED) are disposed on the mechanical deck so as to extend into the tape detection hole 7. Light beams 10, 11 emitted in the left and right directions from the light-emitting elements 8 and 9 are received by light-emitting receiving elements 12, 13 provided on the mechanical deck at opposite sides, respectively, of the cassette 1. The tape T between the tape supply reel 2 and the tape guide 4 crosses the light beam 10. Also, the tape T between the tape guide 6 and the tape takeup reel 3 crosses the other light beam 11.

The tape T is composed of a recording portion which is substantially opaque or has a low light transmittance and leader portions which are substantially transparent or have a high light transmittance provided at respective ends of the recording portion. Owing to a difference of light transmittance between the recording portion and the leader portions, it is possible to detect respective ends (starting end and ending end) of the tape T by optically detecting a difference in the intensity of light introduced into the light-receiving elements 12, 13. The heights of the paths of the light beams 10, 11 which are introduced into the light-receiving elements 12, 13 from the light-emitting elements 8, 9, shall be determined according to the format of the tape cassette.

The light-emitting elements 8, 9 are electrically connected to a flexible base 16 through conductors 14 and 15, respectively, as shown in FIG. 3 in an enlarged scale. The light-emitting elements 8, 9 are supported by supporting members 18, 19 which project from a metal chassis 17 on the mechanical deck. The flexible base 16 is U-shaped in cross-section and acts as a spacer so as to prevent the conductors 14, 15 and the supporting members 18, 19 from contacting one another.

The same Assignee of the present application has the following patents and patent applications, i.e., U.S. Pat. Nos. 4,989,111, 5,024,394.

While the heights of the light paths of the light beam 10, and 11 received by the light-emitting elements 12, 13 from the light-emitting elements 8, 9 are determined according to the tape cassette format, when the tape cassette is reduced in thickness so that the position of the tape detection hole 7 is lowered, the heights of the light-emitting elements 8, 9, i.e., the heights of the light paths of the light beams 10, 11 are reduced inevitably. As a consequence, the flexible base 16 and the conductors 14, 15 have to project from the lower surface of the tape cassette 1 by a distance corresponding to the decrease in the heights of the light paths. In other words, the portions of base 16 and conductor 14, 15 that project from the lower surface of the tape cassette 1 need to be accommodated within the mechanical deck so that the peripheral mechanisms disposed within the mechanical deck have to be disposed so as not to disturb the tape cassette 1. As a result, the mechanical deck either becomes thick or the mechanisms of the mechanical deck are restricted considerably from a design standpoint.

Furthermore, if the tape detection hole is made smaller, then the tape cassette cannot be loaded on the mechanical deck with a sufficient positional freedom.

SUMMARY OF THE INVENTION

Accordingly, it is an object of the present invention to provide a tape end detection mechanism for a tape cassette which avoids the imposition of design limitations on a mechanism of a mechanical deck which receives the cassette even when the heights of the light paths between light-emitting and light-receiving portions are reduced as the tape cassette is reduced in thickness.

It is another object of the present invention to provide a tape end detection mechanism for a tape cassette in which a tape cassette can be loaded on a mechanical deck with sufficient positional freedom.

In accordance with an aspect of the present invention, in a tape end detection mechanism for a tape cassette in which a light beam emitted from a light-emitting element provided on the mechanical deck of a video cassette recorder is radiated from a tape detected hole of the tape cassette and the radiated light beam is received by light-receiving elements through a tape end of a tape to detect the tape end, the tape end detected mechanism is arranged in a manner that a step portion of a notched configuration is provided between the bottom portion of the tape cassette and the tape detection hole, and a prism for introducing a light beam emitted from the light-emitting element is disposed at the step portion so that light beams radiated from light radiating portions of the prism are received by the light-receiving elements, respectively.

In the tape end detection mechanism for a tape cassette according to a preferred embodiment of the present invention, the prism is formed with a light incident portion for making the light beam emitted from the light-emitting element incident thereon through the side portion of the prism, a reflection surface for upwardly reflecting the light beam from the light incident portion, and light radiating portions for splitting the reflected light beam from the reflection surface into two light beams which travel in opposite directions.

In the tape end detection mechanism for a tape cassette according to a preferred embodiment of the present invention, the light radiating portions of the prism are disposed within the tape detection hole.

In the tape end detection mechanism for a tape cassette according to a preferred embodiment of the present invention, the prism and the light-emitting element are positionally fixed to each other.

In the tape end detection mechanism for a tape cassette according to a preferred embodiment of the present invention, light paths of the light beams radiated from the light-emitting element and received by the light-receiving elements are reduced in height.

As described above, the tape end detection mechanism for a tape cassette according to the present invention is configured so that the step portion of a notched configuration is provided between the bottom portion of the tape cassette and the tape detection hole, and the prism for introducing a light beam emitted from the light-emitting element is disposed at the step portion so that light beams radiated from the light radiating portions of the prism are received by the light-receiving elements, respectively. Thus, the light-emitting element for introducing a light beam to the prism can be disposed at an arbitrary position such that the height of the light-emitting element is not influenced by the height of the light paths extending to the light-receiving elements. Therefore, the light paths of the light beams radiated from the light-emitting portion and received by the light-receiving elements are reduced in height. As a consequence, a part of the tape end detection mechanism need not project into the mechanical deck of the video cassette recorder. Thus, the mechanical deck can be prevented form becoming thick and also be prevented from being restricted from a design standpoint.

Further, since the prism is formed with the light incident portion for making the light beam emitted from the light-emitting element incident through the side portion of the prism body, the reflection surface for upwardly reflecting the light beam incident form the light incident portion and the light radiating portions for refracting and dividing the reflected light beam from the reflection surface into two light beams which travel in opposite directions, the light beam emitted from the light-emitting element can be reflected and refracted by the prism to thereby be divided into two light beams and effectively radiated as dispersed light beams.

Further, since the light radiating portions of the prism are disposed within the tape detection hole, even when the tape detection hole is small, the positioning margin is not limited when the tape cassette is loaded on the mechanical deck.

Further, since the prism and the light-emitting element are positionally fixed to each other, both the light-emitting element and the light incident portion of the prism can be accurately aligned with each other.

Furthermore, since the heights of the light paths of the light beams radiated from the light radiating portions of the prism and received by the light-receiving elements are reduced, the present invention can be applied to a variety of tape end detection mechanisms for a tape cassette whose thickness is reduced.

DETAILED DESCRIPTION OF THE PREFERRED EMBODIMENT

A tape end detection mechanism for a tape cassette according to an embodiment of the present invention will now be described with reference to FIGS. 4 to 10.

Figure 1:
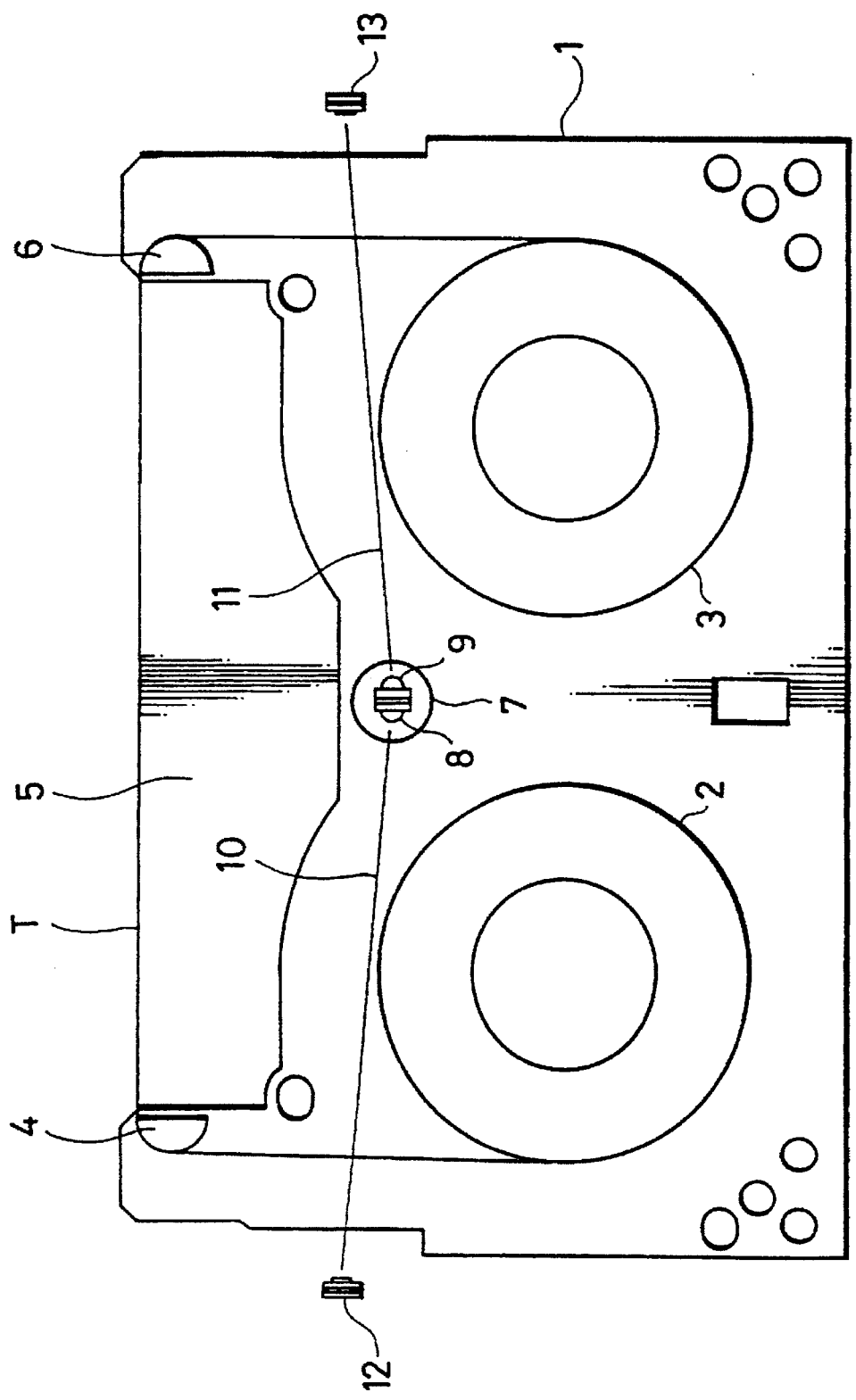
FIG. 1 is a schematic plan view of a tape end detection mechanism and a tape cassette according to the related art.
Figure 2:
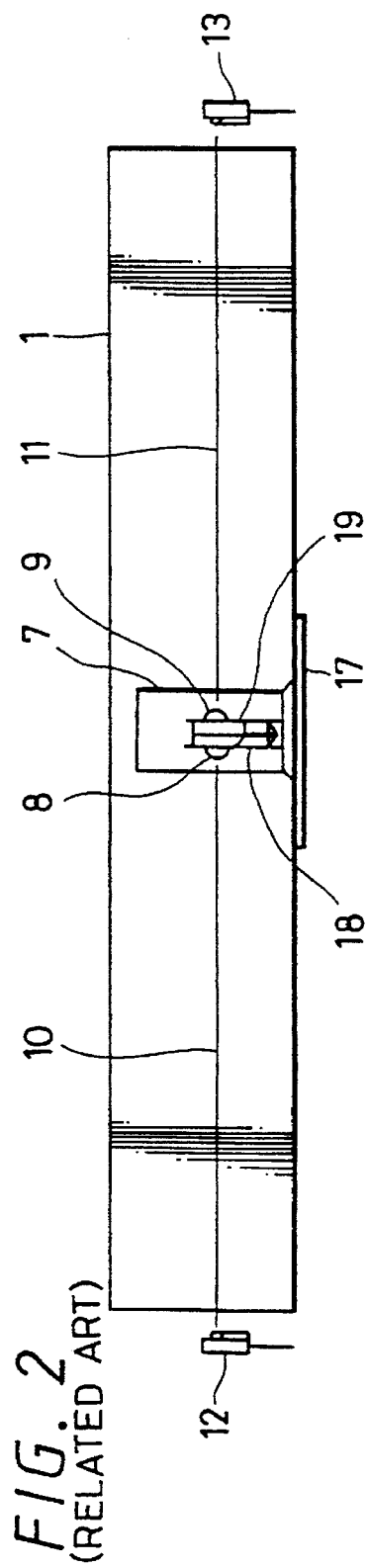
FIG. 2 is a schematic side view of the tape end detection mechanism and the tape cassette according to the related art.
Figure 3:
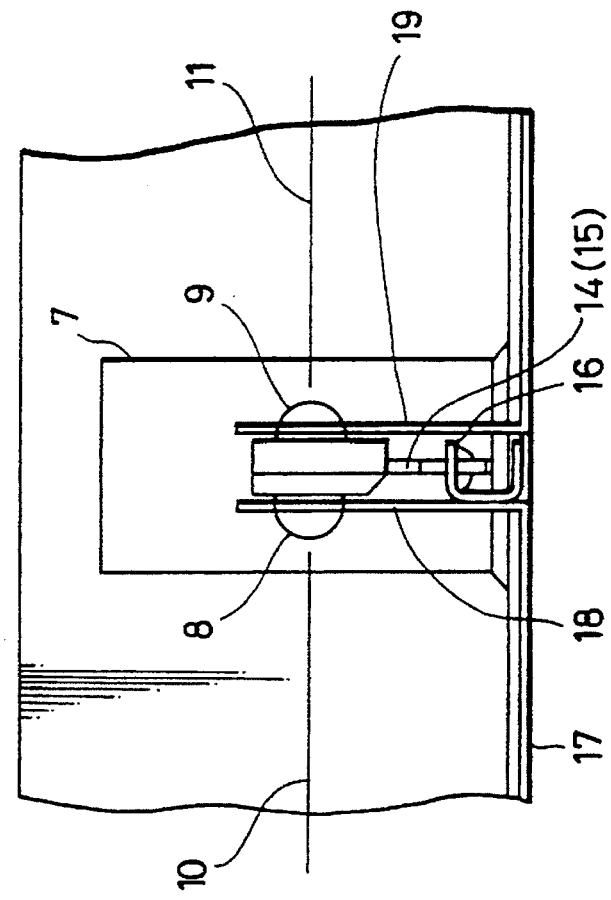
FIG. 3 is a diagram showing in detail a light-emitting portion of the tape end detection mechanism according to the related art.
Figure 4:
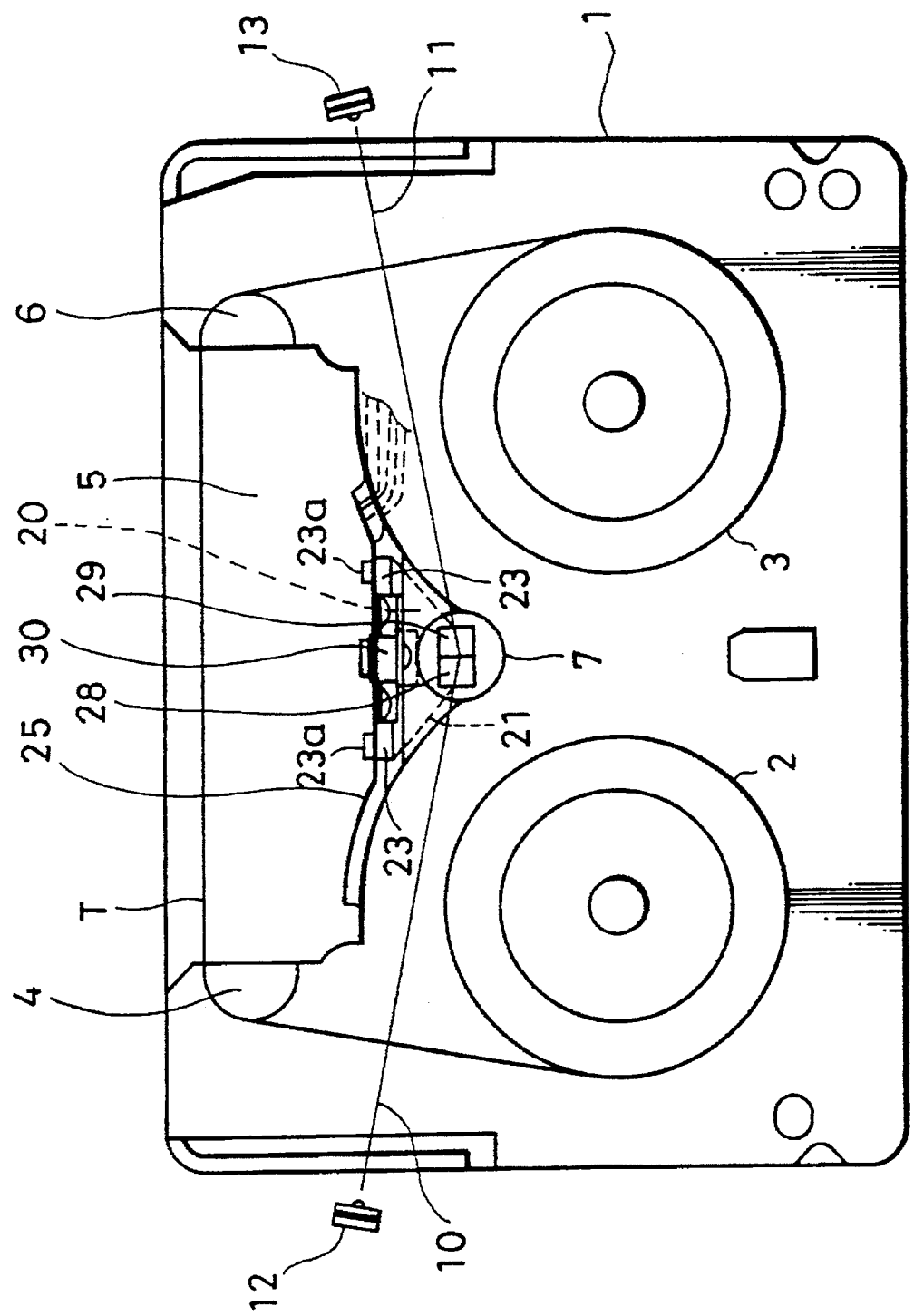
FIG. 4 is a schematic plan view of a tape end detection mechanism and a tape cassette according to an embodiment of the present invention.
Figure 5:
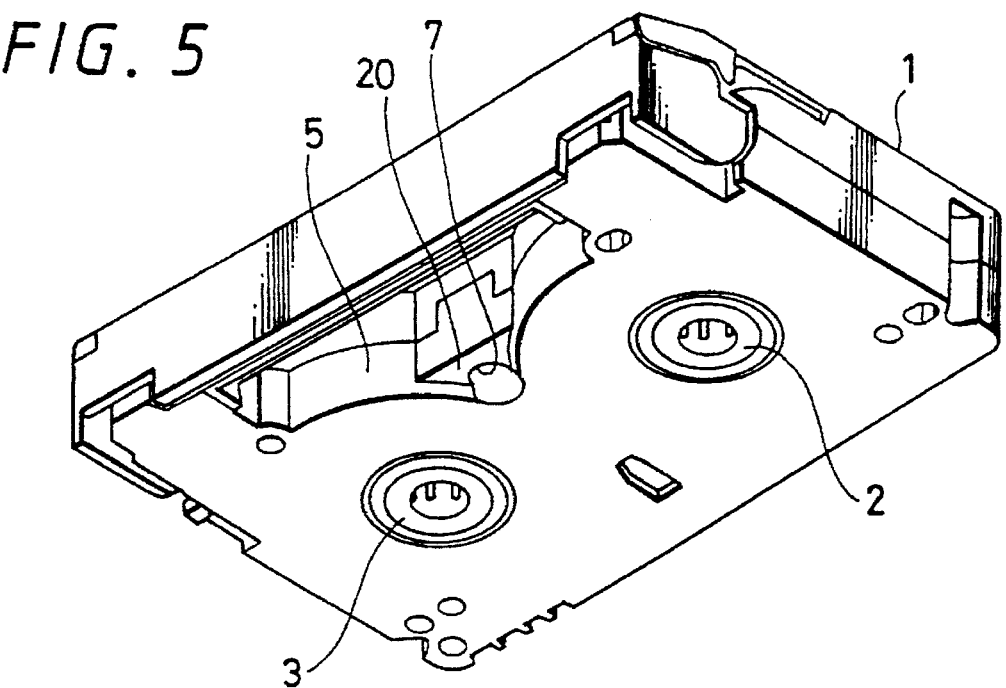
FIG. 5 is a perspective view of the tape cassette of FIG. 4 as viewed from the bottom thereof.

In FIGS. 4 and 5, parts corresponding to those described with reference to FIG. 1 are marked with the same reference numerals and therefore need not be further described.

Figure 10:
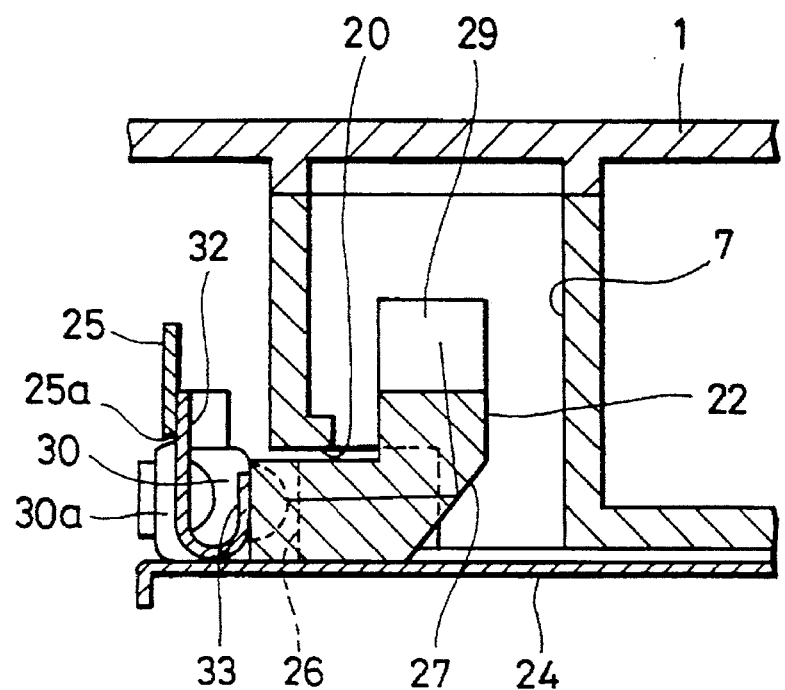
FIG. 10 is a fragmentary cross-sectional view showing the tape cassette loaded onto the tape end detection mechanism which is as viewed in FIG. 9.

As shown in FIGS. 4, 5 and 10, the bottom portion of the upstanding partition or wall defining a tape detection hole 7 of the tape cassette 1 is configured to form a step portion or recess 20 which opens at the bottom surface of the tape cassette and communicates with the mouth portion 5 and the hole 7.

Figure 6:
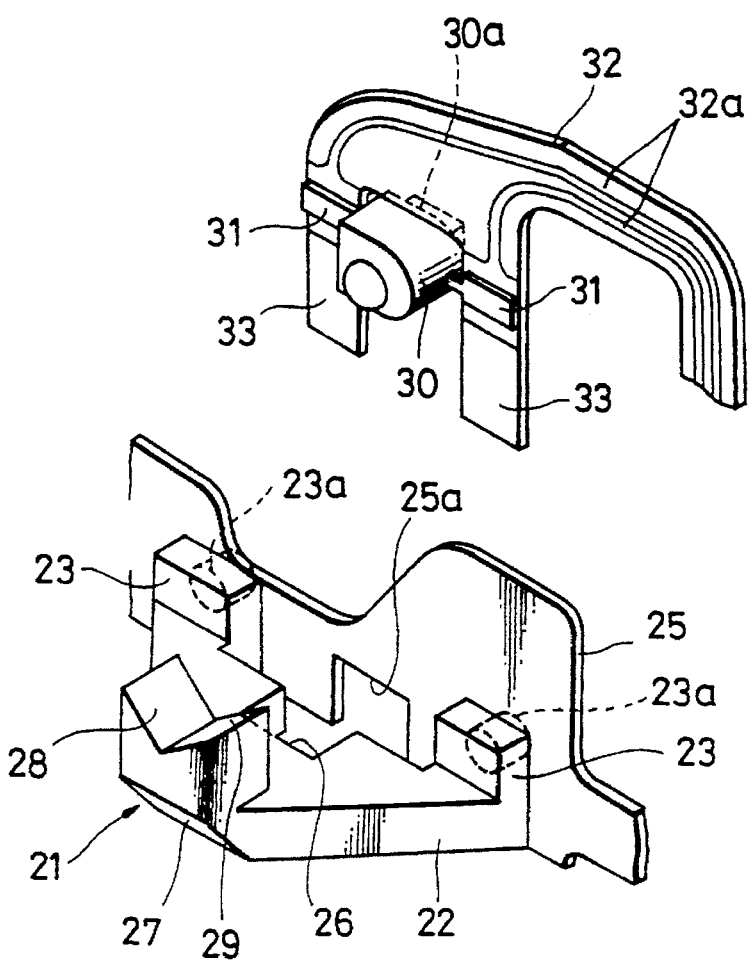
FIG. 6 is an exploded perspective view showing a prism and a light-emitting element of the tape end detection mechanism embodying this invention on an enlarged scale.
Figure 7:
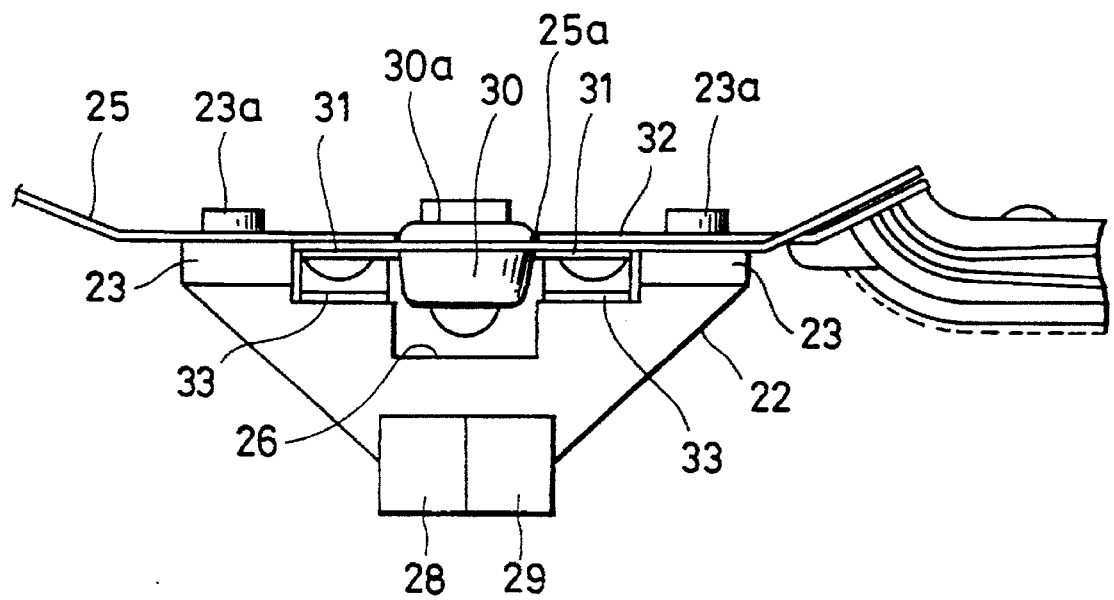
FIG. 7 is a plan view showing the assembled state of the prism and the light-emitting element of FIG. 6.
Figure 8:
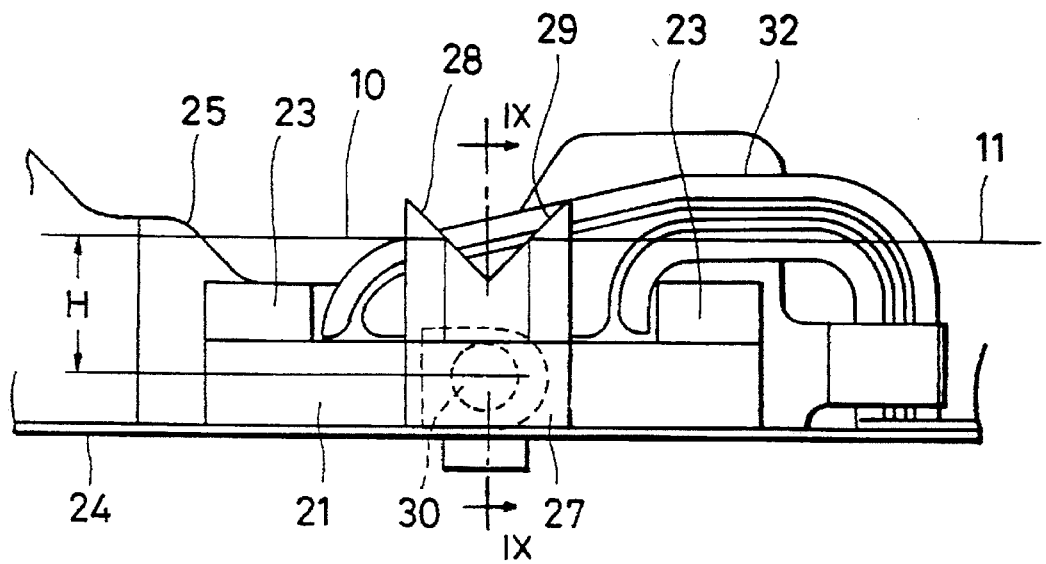
FIG. 8 is a front view showing the assembled state of the prism and the light-emitting element.
Figure 9:
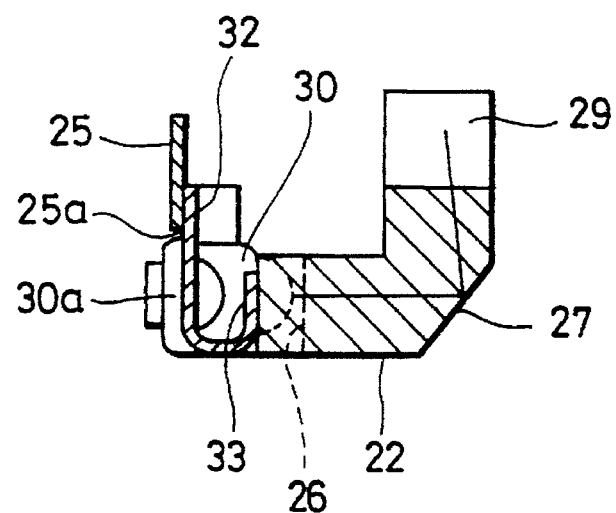
FIG. 9 is a cross-sectional view of the assembled state of the prism and the light-emitting element taken along the lines IX—IX on FIG. 8.

In FIG. 6, a light-emitting portion of the tape end detection mechanism according to an embodiment of this invention is shown to be composed of a prism 21 and a light-emitting element 30. The prism 21 is made of an acrylic resin, glass or the like and includes a generally horizontal prism body 22 of a triangle configuration which is suitably fixed to a metal member 25 as by caulking portions 23a, 23a provided at attachment leg portions 23, extending upwardly from the wide end of prism body 22 adjacent the opposite sides of the prism body 22. The metal portion or bracket 25 projects upwardly from a chassis 24 (FIGS. 8 and 10) of the mechanical deck (not shown) of the VCR. The prism body 22 has a recess defining light incident portion 26 midway between the attachment leg portion 23. An inclined refection surface 27 with an inclination angle of 45 degrees is provided at the narrow end of the prism body 22 in front of the light incident portion 26. An upstanding portion of the prism 21 extending above the light reflection surface 27 is cut, at the top, in a V-shaped configuration to form light radiating portions 28, 29 which are constituted by oppositely inclined surfaces each having an inclination angle of 45 degrees.

The light-emitting element 30 formed of an LED has conductors 31, 31 at opposite sides thereof which are electrically connected to conductive patterns 32a, 32a on a flexible base 32, respectively. The flexible base 32 has resilient tab-like members 33, 33.

The light-emitting element 30 is assembled with the prism 21 as follows. Initially, a convex portion 30a projecting from the rear surface of the light-emitting element 30 is fitted, from the front side of the metal member 25 of the chassis 24, into a cutout formed in the metal member 25 so as to be engaged therewith. In this state, each of the resilient tab-like members 33, 33 of the flexible base 32 is bent into a U-shaped configuration and then urged between the prism body 22 and the metal member 25. Thus, together with the light-emitting element 30, the flexible base 32 is pressed toward the metal member 25 under the spring-biasing action of the resilient tab-like members 33, 33. As a consequence, the convex portion 30a is reliably fitted into the cutout 25a of the metal member 25 and thus can be prevented from being disengaged therefrom.

When the light-emitting element 30 and the prism 21 are assembled together as shown in FIGS. 7-10, a light beam emitted from the light-emitting element 30 is introduced into the prism body 22 through the light incident portion 26 of the prism body 22, then reflected upwardly by the reflection surface 27 to propagate in a direction which is at right angles to the light emitted from element 30. The reflected light is refracted at right angles by the light radiating portions 28, 29 so as to be divided into two light beams which travel in opposite directions away from each other in parallel to the bottom surface of the prism body 22 and are radiated from the prism 21 to the outside.

As shown particularly in FIG. 10, when the tape cassette is mounted on the tape end detection mechanism, the prism body 22 is located in the step portion 20 and the light radiating portions 28, 29 extend upwardly from the prism body 22 within the tape detection hole 7 of the tape cassette 1. Accordingly, the divided light beams extending in the opposite directions from the light radiating portions 28, 29 of the prism 21 are projected from the tape detection hole 7 toward the light-receiving elements 12, 13 along paths intercepted by the tape T between the supply reel 2 and the guide 4 and the tape T between the takeup reel and the guide 6, respectively.

Since the light-emitting element 30 is aligned with the light incident portion 26 provided at the wide end of the prism body 22, the height of the light-emitting element 30 is not influenced by the height of the light paths intercepted by the tape T. Further, since the heights of the light-radiating portions 28, 29 are defined and set by a height H thereof from the light incident portion 26, the heights of the light beams 10, 11 can be reduced by simply reducing the height of the radiating portions of the prism 21. Therefore, no part of the tape end detection mechanism has to be projected into the mechanical deck. Thus, the mechanical deck can be made thin and also be freely designed without limitations imposed by the tape end detecting mechanism.

Furthermore, since only the light radiating portions 28, 29 of the prism 21 are disposed within the tape detection hole 7, even when the tape detection hole 7 is small, the positioning of the cassette relative to the tape end detecting mechanism can be freely realized when the tape cassette is loaded on the mechanical deck.

Having described a preferred embodiment of the invention with reference to the accompanying drawings, it is to be understood that the invention is not limited to that precise embodiment and that various changes and modifications may be effected therein by one skilled in the art without departing from the spirit or scope of the invention as defined in the appended claims.

What is claimed is:

1. In an apparatus for recording and/or reproducing signals on a tape having a substantially opaque recording portion and leader portions of substantially transparent material extending from the ends of said recording portion and being wound on supply and takeup reels in a cassette housing which has a mouth extending across a forward portion of the housing and opening forwardly and downwardly therefrom, tape guides in said housing guiding said tape between the reels in a path having a laterally directed portion extending across said mouth and substantially parallel side portions extending between said reels and said guides, respectively, said housing further having a laterally centered hole in back of said mouth and which opens at a bottom surface of said housing and a recess in said bottom surface through which a lower portion of said, hole communicates with said mouth: the combination of a deck in the apparatus for operatively positioning said housing with said bottom surface upon said deck; and a tape end detecting device comprising a light-emitting element for emitting a beam of light, means mounting said light-emitting element on said deck so that, with said housing of the cassette operatively positioned upon said deck, said light-emitting element is situated in said mouth and said beam of light is directed from said element substantially parallel to said deck through said recess toward said hole, a prism having a lower portion extending through said recess and having an incident surface at one end positioned adjacent to said light-emitting element and at which said beam of light enters said prism, said lower portion of the prism having an inclined reflecting surface at an end of the lower portion remote from said incident surface and which is disposed within said hole of the operatively positioned cassette housing so that said beam of light, having entered the prism at said incident surface, is reflected from said reflecting surface so as to travel upwardly in said hole and an upper-light radiating portion of said prism extending in said hole of the operatively positioned cassette housing and splitting said beam of light from said reflecting surface into two light beams directed laterally in opposite directions, respectively, along paths intercepted by said side portions, respectively, of the tape path in the operatively positioned cassette housing, and light-receiving elements positioned at opposite sides of said cassette housing when the latter is operatively positioned on said deck to receive light of said two light beams, respectively, when one or the other of said leader portions extends in a respective one of said side portions of the tape path, whereby to detect an end of said recording portion of the tape.

2. An apparatus as in claim 1, wherein said upper light-radiating portion of the prism has a V-shaped upper end surface and parallel side surfaces so that said beam of light from said reflecting surface is split into said two beams by reflection from said V-shaped upper end surface and said two beams exit from said prism at said parallel side surfaces thereof.

3. An apparatus as in claim 2; wherein said recess has a substantially triangular configuration so as to increase in width in a direction from said hole toward said mouth, and said lower portion of the prism has a substantially triangular configuration similar to said configuration of the recess with said light radiating portion of the prism extending upwardly from a relatively narrow end portion of said lower portion of the prism at which said reflecting surface is situated.

4. An apparatus as in claim 3; wherein said means mounting said light-emitting element on said deck further includes means fixedly positioning said prism relative to said light-emitting element.

5. An apparatus as in claim 4; wherein said means mounting said light-emitting element includes an upstanding bracket extending from said deck so as to be situated within said mouth of the operatively positioned cassette housing, a flexible base member with conductive patterns thereon to which said light-emitting element is secured, spaced apart attachment leg portions extending from the relatively wide end of said triangular lower portion of the prism and being secured to said bracket, resilient tab members extending from said base member at opposite sides of said light-emitting element and being flexed to engage said wide end of the lower portion of the prism at opposite sides of said incident surface and to thereby urge said flexible base member, and hence said light-emitting element, against said bracket, and said bracket has a cutout receiving and positioning said light-emitting element relative to said bracket and said prism when said flexible base member is urged against said bracket.

6. An apparatus as in claim 5; wherein said two light beams directed laterally in opposite directions to be received by said light-receiving elements are at minimal heights relative to said deck so as to permit said cassette housing to have a reduced thickness.

* * * * *